United States Patent [19]
Kutnyak et al.

[11] 3,860,043
[45] Jan. 14, 1975

[54] DUCT

[75] Inventors: Thomas A. Kutnyak, Anaheim; Robert Trelease, Los Angeles, both of Calif.

[73] Assignee: Automation Industries, Inc., Los Angeles, Calif.

[22] Filed: Dec. 7, 1972

(Under Rule 47)

[21] Appl. No.: 312,855

[52] U.S. Cl. ............... 138/153, 138/141, 138/172, 285/236
[51] Int. Cl. ............................................. F16l 9/14
[58] Field of Search .......... 138/153, 172, 145, 141, 138/DIG. 2, 147, 137, 155, DIG. 3, DIG. 7; 285/236, 423, 149; 161/189, 206

[56] References Cited
UNITED STATES PATENTS

| 1,802,414 | 4/1931 | Evans | 138/118 |
|---|---|---|---|
| 2,254,558 | 9/1941 | Williams | 138/147 X |
| 2,768,925 | 10/1956 | Fay, Jr. | 138/DIG. 3 |
| 2,783,173 | 2/1957 | Walker et al. | 138/DIG. 3 |
| 2,862,524 | 12/1958 | Smith | 138/144 |
| 3,002,534 | 10/1961 | Noland | 138/141 |
| 3,026,223 | 3/1962 | Vanderbilt et al. | 138/153 X |
| 3,443,599 | 5/1969 | Klein | 138/140 |
| 3,457,963 | 7/1969 | Hardwick | 138/172 |
| 3,481,369 | 12/1969 | De Ganahl | 138/153 X |
| 3,528,457 | 9/1970 | Martin et al. | 138/141 X |
| 3,529,664 | 9/1970 | Baker et al. | 138/155 X |
| 3,550,640 | 12/1970 | Wagner et al. | 138/141 |
| 3,552,445 | 1/1971 | Andrews | 138/144 |
| 3,717,180 | 2/1973 | Ambrose et al. | 138/153 |

Primary Examiner—Richard C. Queisser
Assistant Examiner—Daniel M. Yasich
Attorney, Agent, or Firm—Dan R. Sadler

[57] ABSTRACT

An extremely light-weight, semi-rigid waste drain duct is disclosed. The duct is particularly adapted for use in toilet drain systems and the like and includes a semi-rigid laminate duct structure with a ply which is non-porous barrier sandwiched between a pair of fiberglass reinforced plies. In addition, a smooth-seamless and water repellent gel-coat innermost ply is provided. Sections of the duct have flexible receptacle cuff and rigid plug end portions adapted to mate with opposite portions of other such sections. Multiple-ply bands or stiffeners may be disposed along the duct to prevent collapse under negative pressure, the stiffeners being spaced according to the shape and length of the duct.

5 Claims, 6 Drawing Figures

PATENTED JAN 14 1975          3,860,043
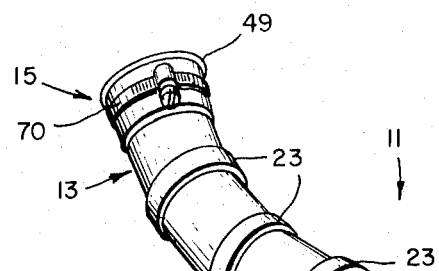
Fig. 1.
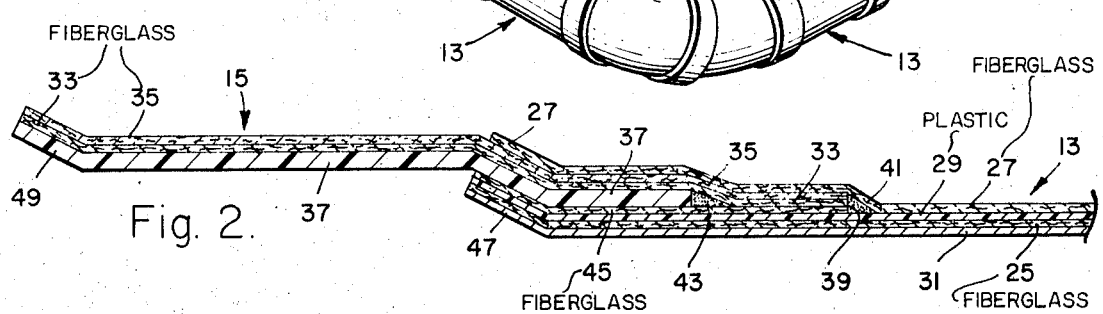
Fig. 2.
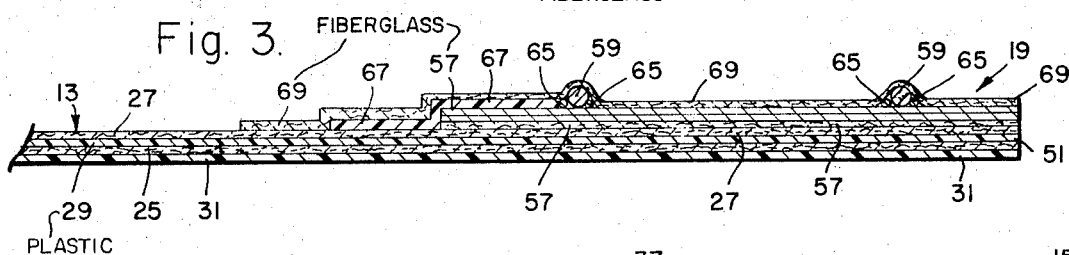
Fig. 3.
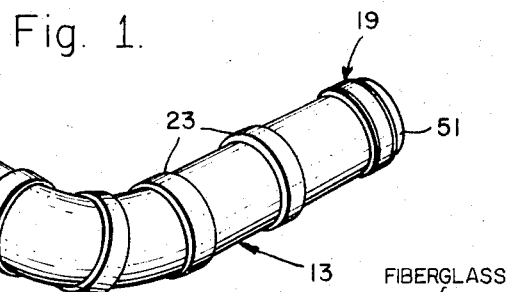
Fig. 6.
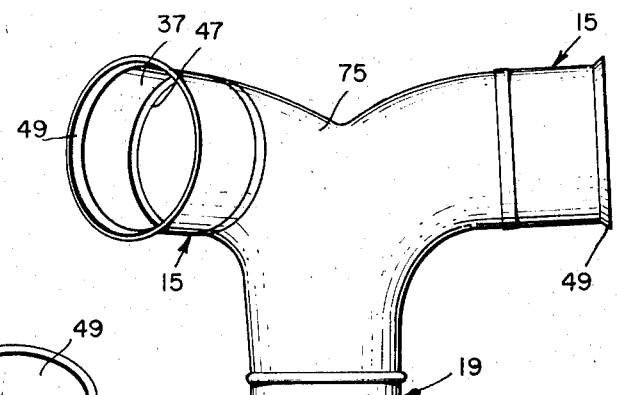
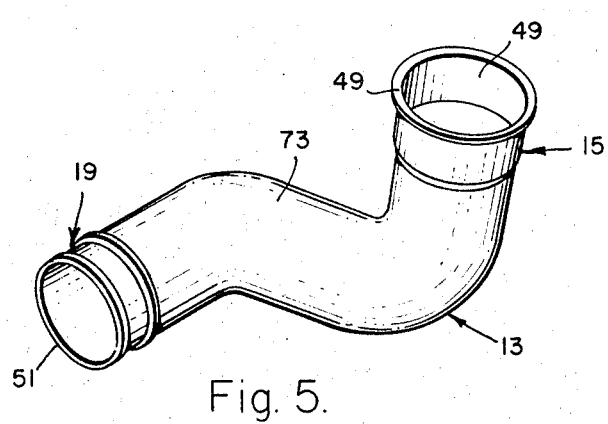
Fig. 4.
Fig. 5.

3,860,043

DUCT

BACKGROUND OF THE INVENTION

Waste conveying and storing systems for use in moving and portable vehicle and enclosure applications are well known. In such systems operating at sea level, rigid metal pipe or duct is generally used with quite satisfactory results. However, waste systems installed in commercial and other high flying aircraft must meet much more stringent and demanding requisites.

Some of the more important characteristics required of waste systems used in aircraft are: stability-in-function, extremely light-weight, reliability sufficiency in strength to withstand the operating pressure and vacuum environment, the capability of preventing waste liquids from permeating through the duct wall, and the satisfying of flame resistant requirements set up by government agencies.

Prior art waste drain systems are generally a compromise which attempts to satisfy as many as possible of the above noted requirements. Heretofore, a typical waste drain system for use in aircraft has utilized rigid stainless steel duct. Although such a duct may meet the flame resistant requirements, it is very expensive to fabricate, is relatively heavy, is difficult and costly to install, and absorbs odors. Flexible tubing or differing construction have been used extensively in land and sea vehicle, however, it has been found that they cannot withstand the negative pressure environment of operation in high flying aircraft. It should therefore be evident that these latter characteristics consititute a significant problem still remaining in the art.

SUMMARY

The present invention provides means for overcoming the foregoing limitations and difficulties. More particularly, the present invention provides an extremely light-weight semi-rigid waste drain duct for use in toilet drain systems and the like.

In an embodiment of the invention disclosed herein, the waste drain duct includes first and second reinforcing plies in concentric relation to each other with a non-porous barrier ply disposed there between. Also, a smooth, seamless and water repellent gel-coat is permanently bonded to the inner wall of the innermost of the reinforcing plies. The gel-coat is preferably a non-odor absorbing flexible material such as Teflon (for example Teflon S). The barrier ply is preferably flexible plastic material and is preferably a self-extinguishing thermo-plastic film which is impervious to liquids and is effective to prevent liquids from penetrating through the wall of the duct. It has been found a material such a Tedlar is particularly well suited for this purpose.

Sections of the duct are provided with mating flexible receptacle cuff and rigid plug end portions for joining elongated duct sections to each other and/or joining such sections to similarly constructed S and Wye shaped structures, etc.

The invention and specific embodiments thereof will be described hereinafter by way of example and with reference to the accompanying drawing in which like reference characters refer to like elements in the several views.

RESUME OF THE DRAWING

FIG. 1 is a perspective view of a light-weight semi-rigid waste drain duct embodying one form of the present invention;

FIG. 2 is a fragmentary cross-sectional view on an enlarged scale of an end portion of a duct of FIG. 1 having flexible cuff thereon.

FIG. 3 is a fragmentary cross-sectional view similar to FIG. 2 but of the opposite end of the duct of FIG. 1 and having a rigid plug.

FIG. 4 is a cross-sectional view on an enlarged scale of a portion of the duct of FIG. 1 showing multipleply stiffener utilized to strengthen the duct for operation under pressure and vacuum environments;

FIG. 5 is a view of an S shaped fitting embodying the invention; and

FIG. 6 is a view of a wye-shpaed fitting embodying the present invention.

DETAILED DESCRIPTION OF THE DRAWING

Referring to the drawing in more detail and particularly to FIG. 1, there is shown a length of duct 11 constructed in accordance with the present invention. Although the duct 11 may be used for any desired purpose, in the present instance it is particularly adapted for use in installations such as aircraft, etc., as part of a waste drain system. In keeping with these requirements the duct 11 is of a light-weight semi-rigid construction. The duct 11 includes a semi-rigid laminated structure 13 having a flexible receptacle cuff portion 15 at one end and a rigid plug end portion 19 at the other end.

Spaced along the duct structure 13 are externally extending circumferential bands or stiffeners 23. These bands or stiffeners 23 reinforce the duct 11. Among other things, they are effective to prevent collapsing of the duct when a negative pressure (i.e., a radially inwardly directed force) is applied. As will be described herein in more detail, if the duct 11 is to be installed in an aircraft or similar vehicle, it should be capable of withstanding at least 10 P.S.I.G. Moreover, if the duct 11 is designed for use in aircraft, it preferably has a weight of not more than approximately 0.048 lbs./ft. When the duct is fabricated according to the present invention, it is capable of meeting these necessary strength, weight, and operational pressure requirements while still insuring meeting the zero leakage requirements of aircraft use.

As best seen in FIGS. 2 and 3 the duct structure 13, (excluding the end of portions 15 and 19), is basically a four-ply laminated structure. In addition it is reinforced by the external multi-ply stiffeners 23 shown in FIG. 4.

The duct structure includes first and second reinforcing plies 25 and 27. These reinforcing plies 25 and 27 by way of example include a polyester-impregnated fiber-glass. A non-porous barrier ply 29 is sandwiched between the reinforcing plies 25 and 27. The barrier ply 29 is preferably a thin plastic film which is effective to prevent liquids penetrating through the duct wall. It is preferable for the ply 29 to be of a fire retardant or a self-extinguishing material, and preferably a thermo plastic material which can be formed in thin sheets without any pin holes being present. By way of example, materials such as Tedlar are well suited for this purpose.

The duct structure further includes an inner liner 31. The inner liner 31 is preferably permanently bonded to the inside of the first reinforcing ply 25 whereby it forms an integral part of the duct structure. The inner liner 31 is preferably water repellent and non-odor absorbing. It is also preferably seamless and very smooth whereby materials are capable of withstanding being cleaned out with rotary-type devices using Nylon or equivalent type brushes.

It has been found that materials such as Teflon and particular Teflon S are especially well suited for this purpose. Teflon materials have an exceptional smooth finish, which prevents or at least substantially prevents materials adhering or sticking thereto. Also the surface is non-wetting, which is of further assistance in preventing materials adhering thereto. Also Teflon has hardness qualities as well as resistance to abrasion, corrosion and chemical reaction, etc., which are well suited for this purpose.

In addition it should be noted that materials such as Teflon, etc., can be conveniently applied to the inside of the duct as a single, continuous gel coating.

The cuff end portion 15 is normally, at least partially, formed separately from the duct 11 and then added thereto. The cuff has a pair of adjacent plies 33 and 35 and an inner liner 37. The plies 33 and 35 are normally a silicon coated, reinforcing, fiberglass fabric. The inner liner 37 is usually a silicon rubber having a limited amount of resilience and elasticity.

As seen in FIG. 2, the two reinforcing plies 33 and 35 lie immediately below the outer reinforcing ply 27 and they extend to the cuff's inner end 39. However, the inner end of the soft silicon rubber inner liner 37 is spaced from the end 39. It will also be noticed that a pair of angular gaps or spaced 41 and 43 exist between the inner ends of the liner 37 and the cuff's two reinforcing plies 33 and 35. These spaces 41 and 43 are preferably filled with a material such as silicon rubber.

An additional reinforcing ply 45 is preferably disposed between the inner surface of the cuff 15 and the barrier ply 29 of the duct structure 13. This reinforcing ply 45 may be a polyester-impregnated fiberglass.

The cuff portion 15 normally includes one or more flared sections. In this embodiment a first flared section 47 is provided for accommodating the mating of the cuff 15 with a fitting such as a rigid plug end 19. A second flared section 49 may also be provided. This section 49 is flared at about 45° for ease of joining the mating ends of ducts 11.

Referring now to FIG. 3, there is shown in detail the rigid plug end portion 19 of the duct 11. Although the cuff portion 15 may be considered as being fabricated as an addition to the duct 11, the plug portion 19 is normally built-up directly and entirely over the outer surface of the duct structure 13 immediately adjacent its end 51.

The plug portion 19 preferably includes several plies 57 and one or more rings or beads 59. In the present instance there are three plies 57 stacked or built-up over the end 51. The plies 57 are normally polyester-impregnated fiberglass.

The loops or beads 59 are preferably wire rings coated with polyester resins and disposed over the outermost ply 57. The beads 59 are prevented from moving laterally by a pair of relatively smaller diameter cords 65 lying along the sides of the wire loops 59.

In order to assist in sealing, it is desirable to provide some form of gasket on the plug portion 19. This may be in the form of a somewhat resilient ply 67, which may be a silicone impregnated or coated fabric that extends inwardly from the innermost loops 59 to beyond the inward edges of the stacked ply 57. The fabric ply 67 and and the two loops or beading 59 may be covered by a polyester fiberglass outer ply 69.

The loops or beads 59 and the additional ply 69 are designed to bear on the soft inner lining 37 of a cuff portion 15, when the latter is fitted about the plug end 19. This arrangement is effective to provide a leak-proof seal between mating sections of the duct 11.

The spacing between the two loops or beads 59 should be suitable for allowing a conventional band-type clamp 70 (see FIG. 1) to seat therebetween when it is tightened around the outside of the cuff. This locks the cuff portion 15 in place on the plug portion 19 and prevents slipping during pressurization.

The stacked plies 57 of thermosetting plastic material are sufficiently rigid and strong to reinforce the rigid end portion 19. This provides the necessary additional strength to withstand the compressive loads created by tightening the clamp 70.

A fragmentary cross-sectional view, on a somewhat enlarged scale, of a portion of one of the stiffeners 23 is shown in FIG. 4. These stiffeners 23 which act as reinforcements are multi-ply laminates which are built-up around the main body of the duct structure. They may be from about ½ to about 4 inches wide and spaced according to the length and shape of the duct structure 13.

It is recommended that ducts with straight sections longer than about 36 inches be reinforced with one or more bands that are fairly wide. This is particularly advantageous in the central portions of the extended straight section.

The stiffeners 23 in the preferred embodiment are built up with about six stacked plies 71. These plies may be a non-bias polyester/fiberglass material. It has been found desirable for these plies to be built-up directly on the exterior of the non-porous barrier ply 29.

The fully built-up stiffeners 23 may then be covered along with the rest of the duct structure by the second or outer reinforcing ply 27. Preferably, the outside diameter for each rib or stiffener 23 is less than the maximum diameter of the cuff portion 15 and/or the plug portion 19 whereby the stiffeners 23 should not interfere with routing or installation of the duct.

The embodiment of the duct illustrated in FIGS. 1 to 4 and described thus far has a substantial length with several straight runs therein. However, it should be understood the invention may be used to make special "fittings" etc., for particular applications. For example, it may be used to make an "elbow" or the S shaped duct 73 of FIG. 5.

Where a duct construction has a plurality of terminations in relatively close proximity to each other, the invention may be used to create the "wye" shaped duct 75 shown in FIG. 6. When the fittings are short, external reinforcing ribs or stiffeners may not be required.

Due to the type of materials and construction involved, the duct 11 is considered as rigid or at least semi-rigid. The foregoing construction permits some flexibility during installation and/or use. A certain amount of flexibility is usually highly desirable, and frequently absolutely necessary, in order to compensate for installation problems. This occurs where there is a misalignment or built-up of tolerances in the structures to be interconnected.

The offset capability of the duct 11 varies in accordance with its length and configuration. By way of example, it has been found that with an embodiment such as shown in FIG. 1 the end of the duct may be displaced from about ⅛ inch to about ½ inch of force required to produce such a deflection ranges from about 20 to 50 lbs., and no special tooling is necessary to aid in the installation of the duct 11.

The waste drain duct 11 when constructed in accordance with the invention exceeds the present FAA flame test and smoke density requirements. For example, the teflon duct inner liner or ply 31 and the barrier film of Tedlar are non-flammable. Both the silicone-coated fiber-glass and the Polyester/fiberglass reinforcing plies 25 and 27 are self-extinguishing. The latter mentioned plies utilize a self-extinguishing Polyester resin system using an antimony-trioxide type flame retardant.

It has been found that when the barrier ply 29 includes a material such as Tedlar, some difficulty is encountered bonding polyester and similar materials thereto. In order to avoid these difficulties, it has been found highly desirable to etch one or both sides of the barrier film and to then coat then with a Polyester adhesive. This is effective to insure the necessary bonding between all of the plies. The barrier film generally is available in one-inch strips and is spiral-wrapped about the first reinforcing ply 25 so that it adheres to itself at the overlaps.

From the foregoing it should be evident that the invention provides a semi-rigid but extremely light-weight, reliable and leak-proof waste drain duct that is strong enough to withstand the operating pressures and vacuum found in commerical aircraft applications and the like and, as such, constitutes a significant advancement of the art.

Having thus described embodiments of the invention, what is claimed is:

1. Light-weight, semi-rigid waste drain duct for use in toilet drain systems and the like, as in aircraft, the duct including the combination of:
   first and second reinforcing fiberglass plies impregnated with polyester resin in concentric relation to each other forming a unitary portion of said duct;
   a non-porous self-extinguishing thermoplastic film disposed between said first and second reinforcing plies preventing liquids from penetrating through the wall of said duct;
   a smooth, seamless and water-repellent plastic gelcoat permanently bonded to the inner wall of the innermost of said reinforcing plies, and a plurality of spaced reinforcing bands integral with the duct, said bands being formed of fiberglass.

2. The duct according to claim 1, wherein said plastic gelcoat is a non-odor absorbing Teflon material.

3. Light-weight, semi-rigid waste drain duct for use in toilet drain systems and the like, as in aircraft, the duct including the combination of:
   a semi-rigid laminate duct structure having a preselected weight and including a nonporous barrier inner ply and a barrier ply;
   reinforcing means including a stacked plurality of fiberglass bands forming spaced external stiffeners integrally disposed circumferentially about and for preventing collapse of said duct structure;
   said duct structure further including a first fiberglass reinforcing ply disposed between said barrier inner ply and said barrier ply and a second fiberglass reinforcing ply disposed about the outer surface of said barrier ply;
   the innermost of said reinforcing bands being disposed adjacent said barrier ply and the outermost being disposed immediately below said second reinforcing ply.

4. The duct according to claim 3, wherein said duct structure also includes a smooth, seamless and water repellent gel-coat as the inner ply of said duct structure.

5. The duct according to claim 4, wherein said gelcoat is a non-odor absorbing Teflon material.

* * * * *